(12) United States Patent
Aklian et al.

(10) Patent No.: US 7,348,039 B2
(45) Date of Patent: Mar. 25, 2008

(54) METHOD OF MAKING A NEWLY INSTALLED PLUMBING SYSTEM RENEWABLE

(76) Inventors: Jak Aklian, 6551 Gentry Ave., North Hollywood, CA (US) 91606; Hakob Grigoryan, 6460 Mammoth Ave., #204, Van Nuys, CA (US) 91401; Sargis Akliyan, 6660 Whitsett Ave., #107, North Hollywood, CA (US) 91606

( * ) Notice: Subject to any disclaimer, the term of this patent is extended or adjusted under 35 U.S.C. 154(b) by 110 days.

(21) Appl. No.: 11/314,765

(22) Filed: Dec. 21, 2005

(65) Prior Publication Data

US 2007/0141252 A1    Jun. 21, 2007

(51) Int. Cl.
*B05D 7/22* (2006.01)

(52) U.S. Cl. .................. 427/230; 427/235; 427/407.1; 427/336

(58) Field of Classification Search ........ 427/230–239, 427/307, 372.2, 379, 402, 407.1, 409; 118/DIG. 10, 118/DIG. 13, 317–318, 408
See application file for complete search history.

(56) References Cited

U.S. PATENT DOCUMENTS

| | | |
|---|---|---|
| 1,890,164 A | 12/1932 | Rosenberger |
| 2,087,694 A | 7/1937 | Malmros |
| 2,298,775 A | 10/1942 | Ralche |
| 2,497,021 A | 2/1950 | Sterns |
| 3,139,704 A | 7/1964 | McCune |
| 3,139,711 A | 7/1964 | Soderberg |
| 3,151,418 A | 10/1964 | Powell |
| 3,286,406 A | 11/1966 | Ashworth |
| 3,485,671 A | 12/1969 | Stephens |
| 3,608,249 A | 9/1971 | Sullivan |
| 3,835,587 A | 9/1974 | Hall |
| 4,005,549 A | 2/1977 | Perry |
| 4,333,277 A | 6/1982 | Tasedan |
| 4,579,596 A | 4/1986 | Murzyn |
| 5,007,461 A | 4/1991 | Naf |
| 5,045,352 A | 9/1991 | Mueller |
| 5,046,289 A | 9/1991 | Bengel |
| 5,231,804 A | 8/1993 | Abbott |
| 5,499,659 A | 3/1996 | Naf |
| 5,622,209 A | 4/1997 | Naf |
| 5,633,038 A * | 5/1997 | Ruschau ..................... 427/239 |
| 5,924,913 A | 7/1999 | Reimelt |
| 6,739,950 B1 | 5/2004 | Kruse |
| 6,860,297 B2 | 3/2005 | Manzon |
| 6,870,143 B2 | 3/2005 | Martinez |
| 2005/0287294 A1* | 12/2005 | Horn ........................ 427/230 |

FOREIGN PATENT DOCUMENTS

| | | |
|---|---|---|
| DE | 3821558 | 12/1989 |
| EP | 0299134 | 1/1989 |
| EP | 0393433 | 10/1990 |
| EP | 0634229 | 1/1995 |
| EP | 0637737 | 2/1995 |
| GB | 2140377 | 11/1984 |
| JP | 02-006882 A * | 1/1990 |

* cited by examiner

*Primary Examiner*—William Phillip Fletcher, III
(74) *Attorney, Agent, or Firm*—Frank G. Morkunas

(57) ABSTRACT

A method of treating pipes to render the inner wall of the pipes resistant to corrosion and pre-mature deterioration. For new pipes, the inner wall is cleansed with a solvent, debris removed, and the inner wall dried. The inner wall is then coated with a corrosion-resistant primer and allowed to dry. The last step is to coat the inner wall with a corrosion- and chemical-resistant topcoat. More than one coat of primer and topcoat may be applied. The pipe may be re-treated by pumping a stripper through the inner wall removing all coating followed by cleansing and re-coating as described above.

2 Claims, No Drawings

METHOD OF MAKING A NEWLY INSTALLED PLUMBING SYSTEM RENEWABLE

CROSS REFERENCES TO RELATED APPLICATIONS

Not applicable

STATEMENT REGARDING FEDERALLY-SPONSORED RESEARCH OR DEVELOPMENT

Not applicable

BACKGROUND OF THE INVENTION

This present invention relates to an improvement in pipes used for conveying water, sewage, gases, fuels, chemicals, and combinations thereof; and more particularly to pipes resistant to corrosion and a method to make such pipes corrosion-resistant and, thereby, longer lasting and easier to maintain.

Copper rarely occurs naturally in water. Most copper contamination in potable water occurs in the water delivery system, as a result of corrosion of the copper pipes or fittings. Copper piping and fittings are widely used in household plumbing. Copper is an essential micro-nutrient and is required by the body in very small amounts, excess copper in the human body can cause stomach and intestinal distress such as nausea, vomiting, diarrhea, and stomach cramps.

Copper rapidly enters the bloodstream and is distributed throughout the body after ingestion. Other foods eaten with copper can affect the amount of copper that enters the bloodstream. The human body is efficient in blocking high levels of copper from entering the bloodstream. Vomiting or diarrhea may follow ingestion of high levels of copper preventing copper from entering the blood. Copper is excreted through feces and urine. It takes several days for copper to be excreted.

Because the physical and chemical characteristics of water vary, the corrosive properties of water vary as well. Factors causing corrosion include acidity (low pH), high temperature, low total dissolved solids (TDS) content and high amounts of dissolved oxygen or carbon dioxide. Generally, naturally soft water is more corrosive than hard water because it is more acidic and has low TDS. Observations have shown increased copper levels in water softened with ion exchange water softeners.

If the water is not corrosive, hard water minerals are slowly deposited on the interior of plumbing. These hard water deposits form a calcium carbonate lining inside pipes and fittings which protects against copper contamination, however, it may take up to five years for an effective calcium carbonate lining to form and softening hard water with an ion exchange unit can either prevent or dissolve the calcium carbonate scale, reducing or eliminating its protective effect.

At very high levels, copper can cause a bitter metallic taste in water and result in blue-green stains on plumbing fixtures. At low levels, copper in potable water may cause no health symptoms. At high levels, copper in potable water may cause symptoms easily mistaken as flu or other illnesses. If water tests indicate copper is present in potable water, the first course of action is to try to identify the source and to eliminate that source.

If the source is piping from the water system itself; i.e., the city's water source, the home user clearly cannot eliminate the source of contamination and other measures can be taken. If the source of copper contamination is the in-home plumbing system, flushing the water system before using the water for drinking or cooking is a solution but it also is wasteful of a valuable resource. Flushing the system refers to running the water from a particular faucet which has not been used for several hours until such time that all the settled water from the in-home lines has been run out of the in-home lines and only 'fresh' water from the city water system runs through.

Another solution is to adopt an alternative drinking and cooking source such as bottled water or to subscribe to a water-delivery service. Though this solves the problem, it can be expensive. If water is corrosive because of low pH, a neutralizing filter can be used to raise the pH of the water and should reduce and may eliminate corrosion problems. Yet another solution would be to install a reverse osmosis or distillation treatment unit on-site to remove copper from the water. This, however, is limited to a single faucet and, naturally, more than one should be installed and properly maintained.

An extremely expensive solution for the home user is to have the in-home system pipes replaced. Not only is this replacement expensive but it is disruptive to the home owner. Another less costly solution is to merely spot-repair damaged or deteriorated areas in the system. In either case, replacement or spot-repair, in time, will not eliminate the problem and it will recur.

A less expensive solution, though still costly, it to engage the services of a pipe-restorer to 'restore' the existing pipes. Once such restorer is the ACE DuraFlo® System which entails heating and drying the pipes; burst sanding the inner walls of the pipes, and applying an epoxy-barrier primer coating on the existing pipes. This type of cleaning process is extremely difficult and requires a great deal of heavy and costly equipment. Though suitable for the intended purpose, over time and repeated applications, this process will increase the structural thickness of the pipe which in turn will cause less liquid to flow through the pipe and thereby render it less efficient and less effective.

The presently described method and system preferably pre-treats new pipes with a novel process which thereby renders the internal structure of the pipes virtually immune to corrosion and simplifies re-treatment should the need occur in the future. Under the presently described method and system, existing pipes may also be processed to render them virtually corrosion resistant. Under the presently described method and system, treated pipes become longer-lasting, become easier to repair, eliminate copper contamination, are protected from premature failure, and become virtually maintenance-free. And, the presently described method and system, in the long-run, costs far less than all the previously described solutions.

Some objects and advantages of the presently described method and system, therefore, include:
  (a) an end to copper contamination in potable water.
  (b) protection for metal pipes from corrosion and premature failure.
  (c) extending the useful life of pipes.
  (d) being easier to apply and to maintain.
  (e) being less costly to apply and to maintain.

The foregoing has outlined some of the more pertinent objects of the presently described method and system. These objects should be construed to be merely illustrative of some of the more prominent features and applications of the intended and presently described method and system. Many other beneficial results can be attained by applying the presently described method and system in a different manner or by modifying the presently described method and system within the scope of the disclosure. Accordingly, other objects and a fuller understanding of the presently described method and system may be had by referring to the summary of the it and the detailed description of the preferred embodiment in addition to the scope of the presently described method and system as defined by the claims taken in conjunction with the accompanying drawings.

BRIEF SUMMARY OF THE INVENTION

The above-noted problems, among others, are overcome by the presently described method and system. Briefly stated, the presently described method and system contemplates creating a treated pipe for commercial or household use which will withstand corrosion, copper contamination (particularly when copper pipes are used), and pre-mature deterioration. Preferably it is meant for new pipes as a pre-treatment prior to installation or use but may be used on and applied to existing systems.

This method entails cleansing the inner wall of the pipe with a solvent and removing all debris and contaminants followed by drying the inner wall. The inner wall is then coated with a primer, preferably any anti-corrosive metal primer or any amine-cured epoxy primer and allowed to dry. The last step is to coat the inner wall with a corrosion-resistant or chemical-resistant, or both, topcoat. Typical topcoats include any polyureas, any polyamids, and any polyurethenes, or any combinations thereof. More than one coat of primer and of topcoat may be applied as needs dictate or warrant.

The pipe may be re-treated by filling it up with a stripping material to remove all previously applied coating (i.e., primer and topcoat; or to removal all previously applied topcoat; or to partially remove previously applied topcoat) followed by cleansing with solvent and re-coating as described above.

The foregoing has outlined the more pertinent and important features of the presently described method and system in order that the detailed description thereof which follows may be better understood so the present contributions to the art may be more fully appreciated. Additional features of the presently described method and system will be further described hereinafter and which will form the subject of the claims. It should be appreciated by those skilled in the art that the conception and the disclosed specific embodiment may be readily utilized as a basis for modifying or designing other structures and methods for carrying out the same purposes of the presently described method and system. It also should be realized by those skilled in the art that such equivalent constructions and methods do not depart from the spirit and scope of the presently described method and system as set forth in the appended claims.

BRIEF DESCRIPTION OF DRAWINGS

There are no drawings relative to this application.

DETAILED DESCRIPTION OF THE INVENTION

On new pipes, the inner wall of the pipe is to be cleansed with a suitable commercially available cleaning solvent. The term "pipe" or its plural "pipes" refers to all types of pipes, be that straight (linear) pipes, curved pipes, or any shapes therefor and also refers to all fittings for the such pipes; i.e., couplings, elbows, T-fittings, Y-fittings, and the like. Suitable solvents include, but are not limited to, any ketone, acetone, metylethylketone, any alcohols, any glycoleters, water, or any combinations thereof.

Every manufacturer of primer and topcoat is recommending solvent or mixture of solvents to clean or prepare metal structure for painting. This concept is adapted to the treatment of pipes herein.

The mode of application for such cleansing may include forced or non-forced circulation, forced or non-forced pumping, or spraying of the solvent through the pipe and cleaning the inner wall of the pipe. The best means of application is by forced pumping the solvent through the pipe such that a sufficient degree of force is applied to the inner walls thereby ensuring their cleansing and simultaneous removal of any debris or particulants.

After the above step has been completed, excess solvent should be removed from the pipe and the inner wall dried. Removal may entail normal draining of the solvent from the pipe, forced removal by blowing or pumping air into and through the pipe, flushing, or by suctioning out the solvent followed by drying or allowing the solvent on the inner wall to dry naturally. Drying may be hastened by blowing or pumping ambient or hot air through the pipe or to follow all manufacturer's cleaning recommendations.

Once the inner wall is dry, a commercially available primer, preferably a primer of low viscosity, is applied to the inner wall. Any suitable corrosion-resistant primer which has a viscosity of between approximately 20 centi-Poise to approximately 70 centi-Poise is preferred. We have found that a range of approximately 22 centi-Poise produces better and quicker results.

The thickness and of primer generally depends on various circumstances such as, the percentage of solid remaining on the primer, the quantity of the thinner, if any, which was added to the primer, and the number of applications (layers or coatings) of the primer being applied to the inner wall of the pipe. The more applications; i.e., coatings of primer, the thicker the primer coating and the greater the protection to the inner wall of the pipe.

Typical primers include, but are not limited to, any metal primer or amine cured epoxy primers such as Zenith®, 999VPLV, CPS 2.1 Epoxy Primer Neutral Base prepared according to the manufacturer's directions. The primers used also may be combined, but need not be, with a suitable solvent or other suitable thinning agent.

After this step has been completed, as with the solvent, excess primer should be removed from the pipe and the inner wall dried. Removal may entail normal draining of the primer from the pipe, forced removal by blowing or pumping air into and through the pipe, or by suctioning out the primer followed by drying or allowing the primer on the inner wall to dry. Drying may be expedited by blowing or pumping ambient or hot air through the pipe.

The next phase entails applying a commercially available topcoat material over the primer, preferably a topcoat of a low viscosity. The topcoat preferably should be of a corrosion-resistant or chemical-resistant variety and have a viscosity of between approximately between approximately 20 centi-Poise to approximately 70 centi-Poise. As with the primer, we have found that a range of approximately 22 centi-Poise for the topcoat produces better and quicker results.

Also, as with the primer, the thickness and of topcoat generally depends on various circumstances such as, the percentage of solid, if any, remaining on the topcoat, the quantity of the thinner, if any, which was added to the topcoat, and the number of applications of the topcoat to the inner wall of the pipe. The more applications; i.e., coatings of topcoat, the thicker the topcoat coating and the greater the protection to the inner wall of the pipe.

Typical corrosion-resistant topcoats include, but are not limited to, any polyureas, any polyamids, and any polyurethenes, such as Valspar® AC200MS, prepared according to the manufacturer's directions.

The mode of application of the topcoat may include forced circulation or pumping of the topcoat through the pipe followed by removal of the topcoat and drying the topcoat or allowing the topcoat to dry naturally on the wall of the pipe. Removal may entail normal draining of the topcoat from the pipe, forced removal by blowing or pumping air into and through the pipe, or by suctioning out the topcoat. Drying may be hastened by blowing or pumping ambient or hot air through the pipe.

Pre-treating new pipes with the above-described process also creates a new and novel pipe (referred to as a 'treated pipe') for commercial and home use which will be longer-lasting than currently used pipes and will require virtually little or no maintenance. Treated pipes as described herein may be re-treated following the above described process provided a removal or stripping process of all the previously applied coatings or only all or a portion of the topcoat precedes the re-treatment.

To remove all coatings from the inner wall (i.e., primer coating and topcoat coating), a suitable coating stripper is applied to the pipe. Any commercially available stripper suitable for the intended purpose will suffice including, but not limited to, any paint remover such as Turco® brand paint remover, Cee-Bee® paint remover, and the like, following the manufacturer's directions of use.

Application may be by filling the pipe with stripper followed by waiting and removal of the stripper and examining the inner wall of the pipe to ensure removal of all coatings. Removal of the stripper may entail normal draining of the stripper from the pipe, forced removal by blowing or pumping air into and through the pipe, forced flushing, spraying, or by suctioning out the stripper.

Forced pumping, forced flushing, or spraying is best for this phase in that the stripper, as it is forced, through the inner wall, also facilitates and accelerates removal of all coatings from the inner wall and elimination the removed coatings and ancillary debris out from the piping system.

Once all coatings have been removed, the re-coating process may commence as described above; i.e., cleansing with solvent, application of primer coating, and application of topcoat. In some cases it may not be necessary to remove all coatings but just to remove the previously topcoat, leaving the previously applied primer, and reapplying a new topcoat.

The present disclosure includes that contained in the present claims as well as that of the foregoing description. Although this presently disclosed method and system has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the presently described method and system. Accordingly, the scope of the presently described method and system should be determined not by the embodiments illustrated, but by the appended claims and their legal equivalents.

What is claimed is:

1. A method of making pipes of a plumbing system renewable, said plumbing system having straight pipes and a plurality of angled joints and fittings, said method comprising the steps of:
    forming a removable skin on all internal wall surfaces of said pipes by applying a cleaning solvent or a mixture of cleaning solvents, each of a low viscosity, through the plumbing system;
    removing excess cleaning solvent or mixtures of cleaning solvent from the plumbing system;
    circulating a primer through the plumbing system to coat said internal wall surfaces;
    removing excess primer from the plumbing system and drying the primer coated on said internal wall surfaces thereby defining a primer coating thereon; and
    circulating a topcoat through the plumbing system to coat said primer coating and drying the topcoat thereby defining a topcoat coating thereon wherein said topcoat coating and said primer coating in combination define said removable skin on said internal wall surfaces wherein said removable skin and contaminants thereon are removable by application of a conventional stripper.

2. The method steps of claim 1 further comprising the steps of:
    circulating a conventional stripper through said internal wall surface until said removable skin is removed from said internal wall surfaces;
    circulating a primer through the plumbing system to coat said internal wall surfaces;
    removing excess primer from the plumbing system and drying the primer coated on said internal wall surfaces thereby defining a new primer coating; and
    circulating a topcoat through the plumbing system to coat said new primer coating and drying the topcoat thereby defining a new topcoat coating and, in combination with said new primer coating, further defining a new removable skin.

* * * * *